United States Patent [19]
Blanchard et al.

[11] Patent Number: 5,874,913
[45] Date of Patent: Feb. 23, 1999

[54] METHOD AND APPARATUS TO COMPENSATE FOR DOPPLER FREQUENCY SHIFTS IN A SATELLITE COMMUNICATION SYSTEM

[75] Inventors: Scott David Blanchard; Joseph Olk Lester, both of Mesa, Ariz.

[73] Assignee: Motorola, Inc., Schaumburg, Ill.

[21] Appl. No.: 705,486

[22] Filed: Aug. 29, 1996

[51] Int. Cl.$^6$ ............................................. H04B 7/185
[52] U.S. Cl. ................................. 342/352; 455/12.1
[58] Field of Search .............................. 342/352, 354, 342/353; 455/12.1, 13.1

[56] References Cited

U.S. PATENT DOCUMENTS

| | | | |
|---|---|---|---|
| 3,906,364 | 9/1975 | Dobson | 375/222 |
| 4,001,690 | 1/1977 | Mack et al. | 455/13.2 |
| 5,432,521 | 7/1995 | Siwial et al. | 342/357 |
| 5,564,098 | 10/1996 | Rodal et al. | 455/314 |
| 5,613,193 | 3/1997 | Ishikawa et al. | 455/12.1 |
| 5,703,595 | 12/1997 | Tayloe et al. | 342/175 |
| 5,729,558 | 3/1998 | Mobin | 371/43 |
| 5,742,908 | 4/1998 | Dent | 455/517 |

*Primary Examiner*—Gregory C. Issing
*Attorney, Agent, or Firm*—Frank J. Bogacz; Sherry J. Whitney

[57] ABSTRACT

In a satellite communication system (10, 30) with at least one ground based transmitter (12, 32), at least one ground based receiver (16, 36) and at least one communication satellite (14, 34), an earth-based receiver (16, 36) self-determines its Doppler correction factors using software algorithms which minimize the amount of hardware required and minimize the time required to acquire the signal.

13 Claims, 3 Drawing Sheets

# METHOD AND APPARATUS TO COMPENSATE FOR DOPPLER FREQUENCY SHIFTS IN A SATELLITE COMMUNICATION SYSTEM

CROSS REFERENCE TO RELATED APPLICATION

The present invention is related to and incorporates by reference U.S. patent application Ser. No. 08/658,043, entitled "Apparatus for Despreading and Demodulating a Burst CDMA Signal", filed Jun. 4, 1996 which is assigned to the same assignee as the present invention.

FIELD OF THE INVENTION

The present invention pertains to satellite communication systems and more particularly to compensating for Doppler frequency shifts in satellite communication systems.

BACKGROUND OF THE INVENTION

A satellite is often used to relay signals to their destination. This allows the transmitted signal to reach beyond the distance constraint imposed by the curvature of the earth. The transmitted signal is modulated to a frequency compatible with the satellite receiver. The satellite receives this signal and then typically re-modulates the signal to a different frequency before it is retransmitted back to the earth. This re-modulation prevents interference between the earth-based receiver and earth-based transmitter.

The signal often contains digital information. This digital information is often directly modulated onto the carrier. The frequency with which the bits are modulated onto the carrier is known as the bit frequency. Alternatively, when Direct-Sequence Spread Spectrum Code Division Multiple Access (DSSS CDMA) is used, the information is spread prior to transmission, and this spread information is modulated at the chip frequency which is typically significantly higher than the information bit rate.

When a satellite is used which is not in a geosynchronous orbit, the signal received at the earth-based receiver is shifted from the frequency that was transmitted due to the motion of the satellite with respect to the earth. In addition, the bit rate and chip rate are also shifted. This change in frequency is referred to as the Doppler frequency shift. This shift is significant when low earth orbits, medium earth orbits and highly elliptical orbits such as the Molniya orbit are used.

The Doppler shift of both the carrier frequency and the bit frequency must be compensated for at the earth-based receiver in order to demodulate the signal. In the current state of the art, several methods are used to compensate for the Doppler shifts.

Classical carrier and bit/chip rate search algorithms which sweep the carrier and bit/chip rate in order to acquire the signal are often used. These receivers search over the entire range of possible received frequencies. Receivers employing this approach suffer from long acquisition times. This is especially evident in CDMA systems where a small frequency error will cause the demodulator either to not acquire or to falsely acquire.

When long acquisition times cannot be tolerated, as in the case for Time Domain Multiple Access (TDMA) and burst signals, long preambles containing unmodulated carrier frequency and known bit patterns are often employed. These approaches thus suffer from poor bandwidth efficiencies as these preambles become increasing longer as the frequency uncertainty increases.

Finally, rapid acquisition receivers often employ parallel channels, each attempting to acquire the signal over a portion of the frequency uncertainty range. This approach increases complexity and cost due to the additional hardware for each channel.

If any of the previously described approaches does not accurately compensate for the frequency offsets, the performance of the system is degraded.

Thus what is needed is a method for compensating for Doppler frequency shifts in satellite communication systems, where the method can rapidly acquire the signal while maintaining bandwidth efficiency, without requiring complex and costly equipment and while minimizing degradation in performance.

BRIEF DESCRIPTION OF THE DRAWINGS

A more complete understanding of the present invention can be derived by referring to the detailed description and claims when considered in connection with the Figures, wherein like reference numbers refer to similar items throughout the Figures, and:

DETAILED DESCRIPTION OF PREFERRED EMBODIMENTS

The present invention describes a method for compensating for Doppler frequency shifts in satellite communication systems using software algorithms. Two advantages of the present invention are that less hardware is required and that bandwidth efficiency of the system is maintained.

Figure 1:
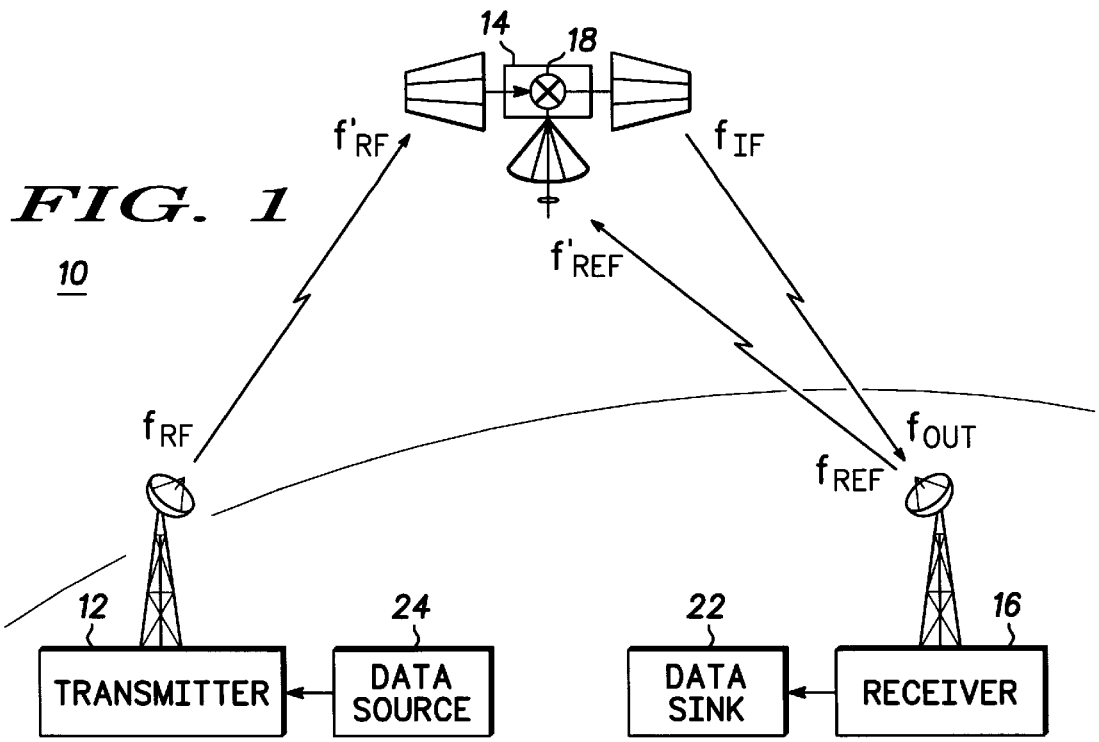
FIG. 1 shows a block diagram of a coherent satellite communication system in accordance with a preferred embodiment of the present invention.

FIG. 1 shows a block diagram of coherent satellite communication system 10 in accordance with a preferred embodiment of the present invention. System 10 includes at least one communication satellite 14, at least one data source 24, at least one earth-based transmitter 12, at least one data sink 22 and at least one earth-based receiver 16. The communication system transfers data from data source 24 to data sink 22. Examples of the types of data include voice, low rate computer and facsimile in the case of a mobile satellite system (MSS), or it can be higher rate computer data such as pictures and files or digital TV signals for high rate low earth orbit (LEO) and medium earth orbit (MEO) communication satellite systems. Operating earth-based transmitter 12 requires a carrier frequency selection, denoted by $f_{RF}$, and a bit rate or chip rate in the case of a CDMA system to be used denoted by $f_b$. Communications satellite 14, is moving relative to either or both earth-based receiver 16 and earth-based transmitter 12.

FIG. 1 depicts a coherent satellite communication system 10 with the transmitted frequencies and the Doppler shifted frequencies shown. $f_{RF}$ is the frequency of the signal transmitted by earth-based transmitter 12 and $f_{RF}'$ is the Doppler shifted frequency received by communication satellite 14. The frequency of the signal received at communication satellite 14 is shifted from the frequency of the signal that was transmitted by earth-based transmitter 12 due to the motion of communication satellite 14 with respect to the earth-based transmitter 12. Because the velocity is small with respect to the speed of light, the following equation is valid:

$$f_{RF}'=f_{RF}(1-V_{CT}/C) \qquad (1)$$

where $V_{CT}$=closing velocity between communication satellite 14 and earth-based transmitter 12 and C is the speed of light. The closing velocity is defined as the component of the relative velocity between communications satellite 14 and earth-based transmitter 12, in the direction of the vector between communications satellite 14 and earth-based transmitter 12. One skilled in the art would recognize that computation of closing velocity requires knowledge of the location of the two objects: communications satellite 14 and earth-based transmitter 12 in this case. The exact location is not required. Any inaccuracies in the location used will generate frequencies slightly in error but the resultant calculation will still significantly improve the acquisition performance and hardware complexity at earth-based receiver 16. In a preferred embodiment, the center location of the beam used to receive the location is used in the calculation of the closing velocity. This crude approximation for location results in a factor of eight reduction in the number of channels required to acquire a burst CDMA signal. $f_{RF}'$ is the apparent frequency of the received signal as seen by the satellite transponder and is the frequency to which the receiver in the communication satellite 14 is tuned.

Communications system 10 uses a coherent transponder. A frequency reference, $F_{REF}$, is transmitted by earth-based receiver 16 to communications satellite 14. Communications satellite 14 phase locks to this reference frequency, $F_{REF}'$, which has been frequency shifted due to Doppler to generate the signals required to frequency convert the received signal prior to transmission to the ground. One skilled in the art would recognize many methods employed to transmit this signal including the direct transmission of a frequency reference, use of a pilot tone or signal on a transmitted signal, or by using the carrier of a received signal as the reference. $f_{LO}'$ is a frequency coherently derived from reference frequency, $F_{REF}$, and is used to convert the received signal to a different frequency. The frequency of the signal used to generate the frequency reference frequency, $F_{REF}'$, received at communication satellite 14 is shifted from the frequency, $F_{REF}$, of the signal that was transmitted by earth-based receiver 16 due to the motion of communication satellite 14 with respect to the earth-based receiver 16. Because this velocity is also small with respect to the speed of light, the following equation is valid:

$$f_{LO}'=f_{LO}(1-V_{CR}/C) \qquad (2)$$

where $f_{LO}$ is the desired frequency which would be used in the absence of Doppler and hence motion between earth-based receiver 16 and communications satellite 14, $V_{CR}$ is the closing velocity between communication satellite 14 and earth-based receiver 16 and C is the speed of light. $f_{LO}'$ is the frequency which the receiver in the communication satellite 14 uses as the Local Oscillator (LO) frequency in the communication satellite. $f_{LO}'$ is the frequency used to down-convert the signal received in the communication satellite to an Intermediate Frequency, $f_{IF}$, using mixer 18. $f_{IF}$ is computed using $f_{RF}'$ and $f_{LO}'$ as shown below for a single conversion receiver:

$$f_{IF}=f_{RF}'\pm f_{LO}' \qquad (3)$$

$$f_{IF}=f_{LO}'-f_{RF}' \qquad (4)$$

One skilled in the art further would recognize that, although multiple conversions could physically be implemented on the satellite, these multiple conversions can be reduced to a single conversion as shown in equations (3) and (4). It should be noted that $f_{IF}$ is computed differently depending on whether the signal spectrum is inverted or not. Equation (3) is used for a normal signal spectrum where $f_{LO}<f_{RF}$ or $f_{LO}<f_{IF}$ and equation (4) is used for an inverted signal spectrum where $f_{LO}>f_{RF}$ and $f_{LO}>f_{IF}$.

For example, assume that the signal ($f_{RF}'$) is received at a frequency f 1000 MHz. Also, assume that it is desired to use a transmitted frequency f 1200 MHz, and that the transmitted spectrum is not to be inverted (normal spectrum). Further, assume that the closing velocity between earth-based receiver 16 and communications satellite 14 is such that $(1-V_{CR}/C)=1.001$. In this example, a signal near 200 MHz would be used to convert the transmitted frequency. The signal would not be exactly 200 MHz due to Doppler as previously discussed. In this example, $f_{LO}=200$ MHz, and using equation (2), $f_{LO}'$ is calculated to be 200.2 MHz. Thus $f_{IF}$ would be 1202.2 MHz according to equation (3).

$f_{OUT}$ is the carrier frequency of the signal as received at earth-based receiver 16. This signal is also shifted due to the relative motion between communications satellite 14 and earth-based receiver 16 as follows:

$$f_{OUT}=f_{IF}(1-V_{CR}/C) \qquad (5)$$

In a preferred embodiment of the present invention, the desired output carrier frequency, $f_{OUT}$, is computed without the use of special carrier recovery signal processing. $f_{OUT}$ is computed as follows:

$$f_{OUT}=f_{FR}(1-V_{CT}/c)-f_{LO}(1-V_{CR}c)(1-V/c) \qquad (6)$$

Equation (6) can be rewritten as follows for a normal signal spectrum where $f_{LO}<f_{RF}$ or $f_{LO}<f_{IF}$:

$$f_{OUT}=f_{RF}\beta_{CT}\beta_{CR}\pm f_{LO}\beta^2{}_{CR}. \qquad (7)$$

In addition, equation (6) can be rewritten as follows for an inverted signal spectrum where $f_{LO}>f_{RF}$ and $f_{LO}>f_{IF}$:

$$f_{OUT}=f_{LO}\beta^2{}_{CR}+f_{RF}\beta_{CT}\beta_{CR}. \qquad (8)$$

In both equation (7) and equation (8), the following equations apply:

$$\beta_{CT}=1-V_{CT}/c \qquad (9)$$

and $$\beta_{CR}=1-V_{CR}/c. \qquad (10)$$

Equations (7) and (8) account for the Doppler frequency shifts of the carrier frequency. By using this calculated received carrier frequency as the input to the receiver, there is significantly less uncertainty in the carrier frequency. This reduction in uncertainty permits using less of a preamble signal or fewer channels when used with burst and TDMA and reduces acquisition time for all other signal types.

The bit or chip frequency as perceived by earth-based receiver 16 is also shifted due to the expansion or contraction of the signal bandwidth caused by the relative motion of earth-based transmitter 12 and earth-based receiver 16. The shift in bit frequency is independent of all frequency conversions. The bit or chip frequency at the output is given by:

$$f_{BF}=f_{BF}\beta_{CT}\beta_{CR} \tag{11}$$

where $f_{BF}$ is the bit or chip frequency at earth-based transmitter 12, and $f_{BF}$ is the bit or chip frequency at the output. Using this calculated bit or chip rate as an input to earth-based receiver 16 further improves acquisition performance and reduces the number of simultaneous channels or known bit pattern length used in the preamble.

Equations (1) through (11) show that the output frequency, $f_{OUT}$, depends on the frequency parameters and the two closing velocities. In a preferred embodiment of the present invention, the frequency parameters are known and the closing velocities are computed.

Figure 2:
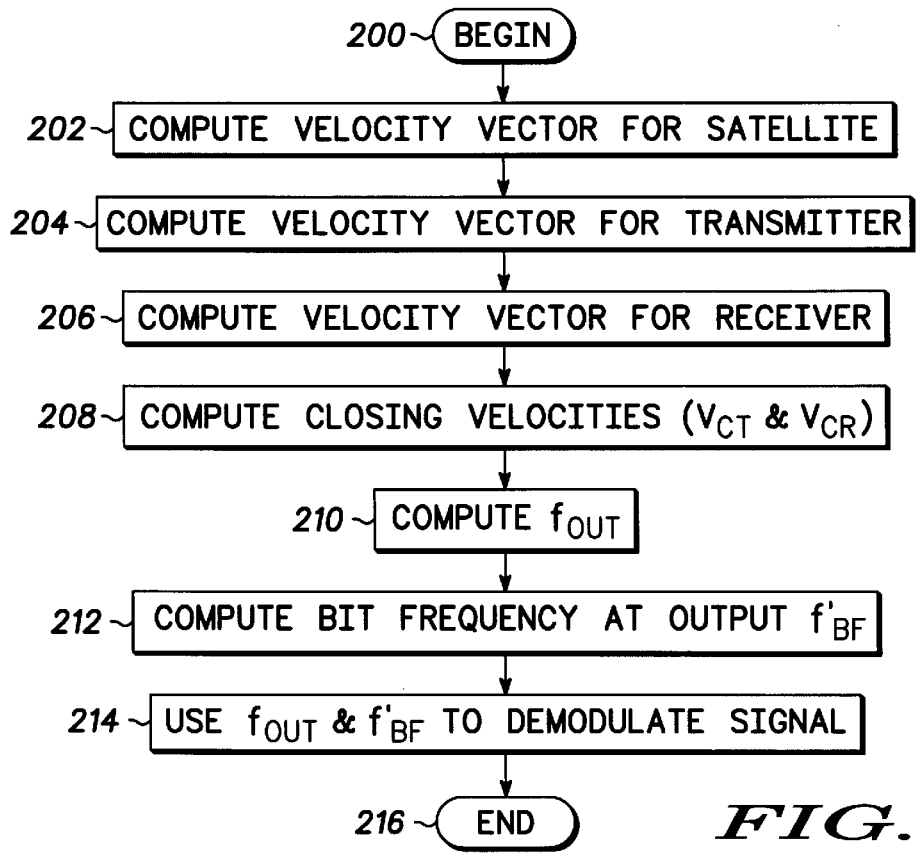
FIG. 2 shows a flow chart for a coherent Doppler frequency compensation procedure desirably performed by a receiver in accordance with a preferred embodiment of the present invention.

FIG. 2 shows a flow chart for a Doppler frequency compensation procedure desirably performed by a receiver in accordance with a preferred embodiment of the present invention. In order to compute the closing velocities, the velocity vector of communication satellite 14, earth-based transmitter 12, and earth-based receiver 16 must be computed. The location of earth-based transmitter 12 and earth-based receiver 16 must either be known or estimated. In a preferred embodiment, the location of earth-based receiver 16 is known and the center of the beam used to receive the signal is used as an estimate of the location of earth-based transmitter 12.

The method begins in step 200, and in step 202 the velocity vector of the communication satellite is computed as follows. Given the orbital elements for the communication satellite, the state vector for the communication satellite is computed. The state vector elements are the position and velocity of the communication satellite at a known time. The orbital elements are the parameters that define the motion of the communication satellite. In a preferred embodiment of the present invention, the classical orbital elements for a Keppler model of the orbit are used. Those skilled in the art will appreciate that other orbital elements can be used if another model of the orbit is employed. These orbital elements are used in a computer program that computes the communication satellite's current position and velocity given the orbital elements and the current time.

The velocity vector of earth-based transmitter 12 is computed in step 204 and the velocity vector for earth-based receiver 16 is computed in step 206. Both are computed by assuming a constant angular rotation vector for the earth such that using the estimated or known locations, those skilled in the art can readily compute their velocity vectors. Alternatively, other means can be used to estimate location and velocity including the use of the Global Positioning System (GPS) which is in wide spread use today.

The closing velocities, $V_{CT}$ and $V_{CR}$, are computed in step 208. In step 210, equation (7) or (8) is used to compute the output frequency, $f_{OUT}$, and the resulting frequency correction factors needed to compensate for the Doppler shift of the carrier frequency. In step 212, equation (11) is used to compute the output bit frequency, $f_{BF}$, and the resulting frequency correction factor needed to compensate for the Doppler shift of the bit frequency. In step 214, these correction factors are input to the earth-based receiver hardware and used to demodulate the signal. The method ends in step 216. Desirably, steps 200 through 216 are repetitively computed since the closing velocities and locations of the earth-based transmitter 12, earth-based receiver 16, and satellite change with time.

FIG. 2 shows a flow chart of tasks desirably performed by a processor in earth-based receiver 16 in accordance with a preferred embodiment of the present invention. An alternate embodiment of the present invention distributes the processor functions between communication satellite 14 and earth-based receiver 16.

Figure 3:
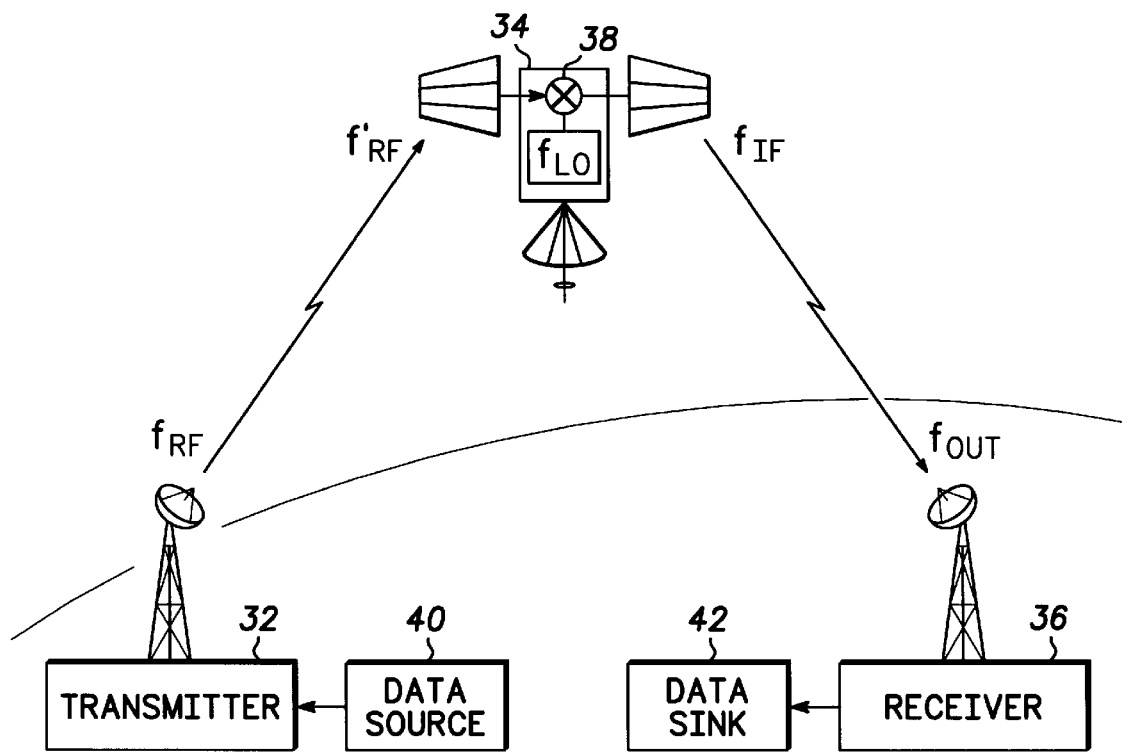
FIG. 3 shows a block diagram of a non-coherent satellite communication system in accordance with a preferred embodiment of the present invention.

FIG. 3 shows a block diagram of non-coherent satellite communication system 30 in accordance with a preferred embodiment of the present invention. FIG. 3 depicts a non-coherent satellite communication system 30 with the transmitted frequencies and the Doppler shifted frequencies shown. System 30 includes at least one communication satellite 34, at least one data source 40, at least one earth-based transmitter 32, at least one data sink 42 and at least one earth-based receiver 36. The communication system transfers data from data source 40 to data sink 42. FIG. 3 is similar to FIG. 1 except that the Local Oscillator (LO) frequency in satellite 34 is not derived from a signal transmitted from earth-based receiver 36 on the ground to the satellite 34. Instead the LO frequency is generated internally in satellite 34 and used with mixer 38 to down-convert the received signal. As in FIG. 1, $f_{RF}$ is the frequency of the signal transmitted by earth-based transmitter 32 and $f_{RF}$ is the Doppler shifted frequency of the signal received by communication satellite 34. Also as in FIG. 1, the frequency of the signal received at communication satellite 34 is shifted from the frequency of the signal that was transmitted by earth-based transmitter 32 due to the motion of communication satellite 34 with respect to the earth-based transmitter 32. In this non-coherent case, the equation for the output frequency, $f_{OUT}$, for the normal signal spectrum where $f_{LO}<f_{RF}$ or $f_{LO}<f_{IF}$ is:

$$f_{OUT}=f_{RF}\beta_{CT}\beta_{CR}\pm f_{LO}. \tag{12}$$

In addition, the equation for the output frequency, $f_{OUT}$, for the inverted signal spectrum where $f_{LO}>f_{RF}$ and $f_{LO}>f_{IF}$ is:

$$f_{OUT}=f_{LO}-f_{RF}\beta_{CT}\beta_{CR}. \tag{13}$$

Equations (12) and (13) can be substituted for equations (7) and (8) when the communication system is non-coherent.

Figure 4:
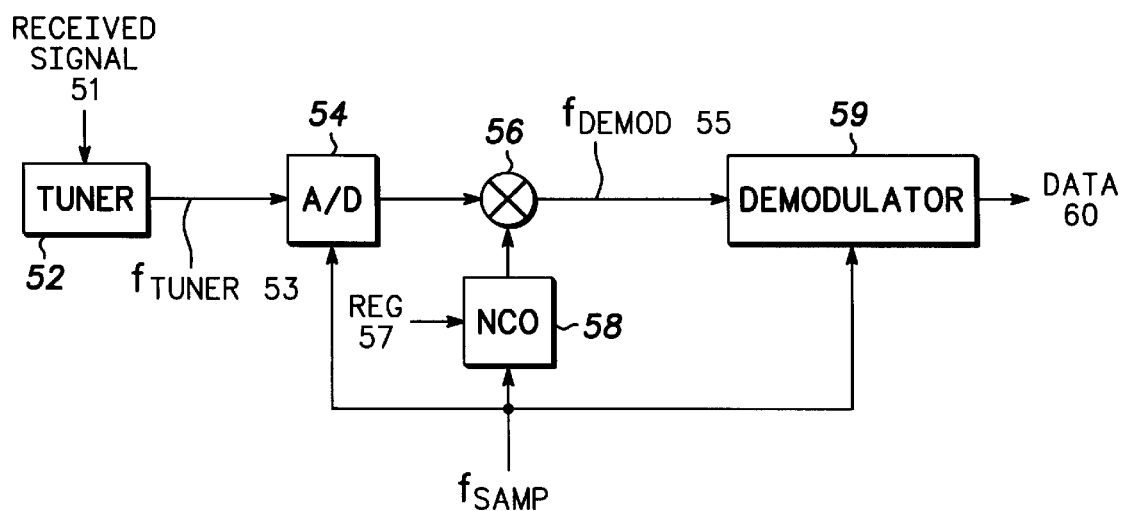
FIG. 4 shows a block diagram of a digital based receiver used in accordance with a preferred embodiment of the present invention.

FIG. 4 shows a block diagram of digital based receiver 50 used in accordance with a preferred embodiment of the present invention. Receiver 50 desirably includes tuner 52, analog to digital converter (A/D) 54, digital mixer 56, numerically controlled oscillator (NCO) 58 and demodulator 59. Referring to FIG. 4, received signal 51 at earth-based receiver 16 or earth-based receiver 36 is provided to tuner 52. Tuner 52 converts received signal 51 which has a carrier frequency at $F_{OUT}$ to a more convenient carrier frequency, $f_{TUNER}$ 53, for digital signal processing. This is a frequency typically near DC, but if the received frequency is sufficiently low, tuner 52 is not needed and received signal 51 can be directly coupled to A/D 54.

Tuner 52 is coupled to A/D 54 which digitizes the signals. A/D 54 can be either a real A/D generating a sequence of real sampled values, or can be a complex A/D generating a sequence of complex sampled values. The sample rate used to sample the input by A/D 54 is selected by $f_{SAMP}$. This is set to a multiple of the bit rate as follows:

$$f_{SAMP}=f_{BF}'a \tag{14}$$

where a is a constant. In a preferred embodiment, a=8.

The output of A/D 54 is routed to digital mixer 56. Digital mixer 56 converts the center frequency of the signal to the frequency, $f_{DEMOD}$ 55, desired by demodulator 59. This is accomplished by multiplying and filtering, if necessary, the output of A/D 54 by the signal produced by NCO 58. NCO 58 generates a frequency based upon the value of REG 57, set by the following equation:

$$f_{NCO}=f_{SAMP}*REG/R \qquad (15)$$

where $F_{NCO}$ is the frequency of NCO 58, and R is a constant, typically a power of two.

The output of digital mixer 56 is routed to demodulator 59 which demodulates the signal and generates data 60. In a preferred embodiment, demodulator 59 is a non-coherent match filter based burst DSSS receiver. Those skilled in the art will note that digital mixer 56 and NCO 58 can be implemented as a series of mixing operations rather than a single operation if desired due to digital signal processing part selection.

Because the frequency of NCO 58 is a function of the sample rate, which by equation (14) is related to the bit rate, the NCO frequency can be written as:

$$f_{NCO}=f_{BF}a*REG/R. \qquad (16)$$

if the desired carrier frequency by demodulator 59 is $f_{DEMOD}$ 55, and the frequency at the output of the tuner is $f_{TUNER}$. The value of REG, which sets the frequency of NCO 58 is computed as follows:

$$REG=R*(f_{DEMOD}-f_{TUNER})*a/f_{BF}\beta CT\beta_{CR}. \qquad (17)$$

Equations (14) through (17) show that the sample frequency and the NCO register settings used in a digital based receiver are computed from the Doppler correction factors. In a preferred embodiment of the present invention, the frequency parameters are known and the closing velocities are computed.

Figure 5:
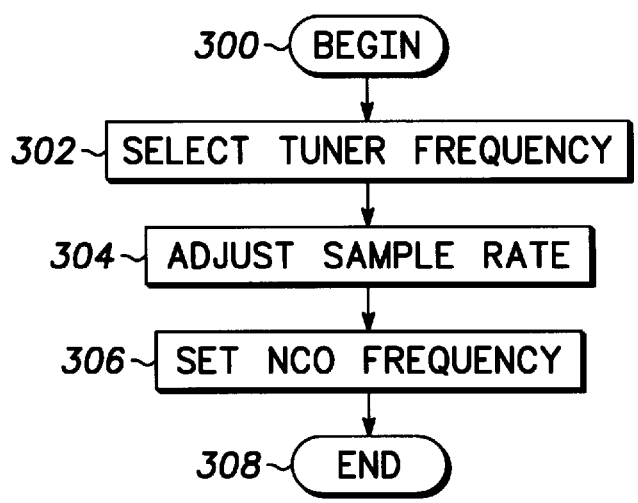
FIG. 5 shows a flow chart for configuring a digital based receiver in accordance with a preferred embodiment of the present invention.

FIG. 5 shows a flow chart for configuring a digital based receiver in accordance with a preferred embodiment of the invention. The procedure begins in step 300, and in step 302, the tuner frequency is selected, resulting in a estimated tuner output frequency based upon the estimated apparent input frequency as computed by equations (7), (8), (12) or (13). In step 304, the sample rate is adjusted based upon the estimated apparent received bit rate using equation (11) or (14). In step 306, the NCO frequency is set by calculating the register setting using equation 17 and tuner frequency setting selected in step 302. The procedure ends in step 308.

In contrast to known communication systems, a communication system constructed in accordance with the present invention enables a earth-based receiver 16 to reduce the uncertainty in the apparent bit rate and carrier frequency by computing estimated Doppler correction factors. By having a reduced uncertainty, the present invention requires a shorter preamble and/or fewer parallel channels to acquire a burst or TDMA signal. With this reduced uncertainty the performance is improved by having a shorter acquisition time and the opportunity for false lock in a CDMA system is reduced.

The present invention has been described above with reference to a preferred embodiment. However, those skilled in the art will recognize that changes and modifications can be made in this preferred embodiment without departing from the scope of the present invention. For example, while preferred embodiments have been described in terms of using specific equations for determining corrected frequencies and correction factors, other equations or methods can also be employed. Accordingly, these and other changes and modifications which are obvious to those skilled in the art are intended to be included within the scope of the present invention.

What is claimed is:

1. In a satellite communication system comprising at least one earth-based transmitter, at least one communication satellite and at least one earth-based receiver, a method of compensating for Doppler frequency shifts comprising the steps of:

a) computing velocity vectors for said at least one earth-based transmitter, for said at least one communication satellite, and for said at least one earth-based receiver;

b) computing, based on the velocity vectors, a first closing velocity vector between said at least one earth-based transmitter and said at least one communication satellite, wherein said first closing velocity vector is a component of a relative velocity between said at least one earth-based transmitter and said at least one communication satellite;

c) computing, based on the velocity vectors, a second closing velocity vector between said at least one earth-based receiver and said at least one communication satellite, wherein said second closing velocity vector is a component of a relative velocity between said at least one earth-based receiver and said at least one communication satellite;

d) computing an output carrier frequency based on the first closing velocity vector and the second closing velocity vector;

e) computing an output bit frequency based on the first closing velocity vector and the second closing velocity vector; and f) using, by receiver hardware of a receiver of said at least one earth-based receiver, correction factors derived from said output carrier frequency and said output bit frequency to demodulate a signal received by said receiver from said at least one communication satellite.

2. A method as claimed in claim 1 wherein step (a) comprises the step of computing said velocity vectors for said at least one communication satellite using a Keppler model of an orbit of said at least one communication satellite.

3. A method as claimed in claim 1 wherein step (a) further comprises the step of computing said velocity vectors for said at least one earth-based transmitter by using a constant angular rotation vector for an earth.

4. A method as claimed in claim 1 wherein step (a) further comprises the step of computing said velocity vectors for said at least one earth-based receiver by using a constant angular rotation vector for an earth.

5. A method as claimed in claim 1 wherein step (b) further comprises the step of using an approximate location of said earth-based receiver in computing said closing velocity vector.

6. A method as claimed in claim 5 wherein said approximate location is a center of a beam used to receive signals from said at least one earth-based transmitter.

7. A method as claimed in claim 1 wherein step (d) further comprises the step of computing a Doppler frequency shift of a carrier frequency at an input of an earth-based receiver.

8. A method as claimed in claim 7 wherein said carrier frequency at said input of said earth-based receiver is computed for a normal spectrum case where $f_{LO}<f_{RF}$ or $f_{LO}<f_{IF}$ in a coherent system using an equation:

$$f_{OUT}=f_{RF}\beta_{CT}\beta_{CR}\pm f_{LO}\beta^2_{CR};$$

where $$\beta_{CT}=1-V_{CT}/C;$$

$\beta_{CR}=1-V_{CR}/C;$ $f_{RF}$ is a carrier frequency of a signal transmitted by said at least one earth-based transmitter;

$f_{LO}$ is a Local Oscillator frequency;

$f_{IF}$ is an Intermediate Frequency;

$V_{CT}$ is a closing velocity between said at least one communication satellite and said at least one earth-based transmitter;

$V_{CR}$ is a closing velocity between said at least one communication satellite and said at least one earth-based receiver; and C is a speed of light.

9. A method as claimed in claim 7 wherein said carrier frequency at said input of said earth-based receiver is computed for an inverted spectrum case where $f_{LO}>f_{RF}$ and $f_{LO}>f_{IF}$ in a coherent system using an equation:

$$f_{OUT}=f_{LO}\beta^2_{CR}-f_{RF}\beta_{CT}\beta_{CR};$$

where $\beta_{CT}=1-V_{CT}/C;$ $\beta_{CR}=1-V_{CR}/C;$ $f_{RF}$ is a carrier frequency of a signal transmitted by said at least one earth-based transmitter;

$f_{LO}$ is a Local Oscillator frequency;

$f_{IF}$ is an Intermediate Frequency;

$V_{CT}$ is a closing velocity between said at least one communication satellite and said at least one earth-based transmitter;

$V_{CR}$ is a closing velocity between said at least one communication satellite and said at least one earth-based receiver; and C is a speed of light.

10. A method as claimed in claim 7 wherein said carrier frequency at said input of said earth-based receiver is computed for a normal spectrum case where $f_{LO}<f_{RF}$ or $f_{LO}<f_{IF}$ in a non-coherent system using an equation:

$$f_{OUT}=f_{RF}\beta_{CT}\beta_{CR}\pm f_{LO};$$

where $\beta_{CT}=1-V_{CT}/C;$ $\beta_{CR}1-V_{CR}/C;$ $f_{RF}$ is a carrier frequency of a signal transmitted by said at least one earth-based transmitter;

$f_{LO}$ is a Local Oscillator frequency;

$f_{IF}$ is an Intermediate Frequency;

$V_{CT}$ is a closing velocity between said at least one communication satellite and said at least one earth-based transmitter;

$V_{CR}$ is a closing velocity between said at least one communication satellite and said at least one earth-based receiver; and C is a speed of light.

11. A method as claimed in claim 7 wherein said carrier frequency at said input of said earth-based receiver is computed for an inverted spectrum case where $f_{LO}>f_{RF}$ and $f_{LO}>f_{IF}$ in a non-coherent system using an equation:

$$f_{OUT}=f_{LO}-f_{RF}\beta_{CT}\beta_{CR};$$

where $\beta_{CT}=1-V_{CT}/C;$ $\beta_{CR}=1-V_{CR}/C;$ $f_{RF}$ is a carrier frequency of a signal transmitted by said at least one earth-based transmitter;

$f_{LO}$ is a Local Oscillator frequency;

$f_{IF}$ is an Intermediate frequency;

$V_{CT}$ is a closing velocity between said at least one communication satellite and said at least one earth-based transmitter;

$V_{CR}$ is a closing velocity between said at least one communication satellite and said at least one earth-based receiver; and C is a speed of light.

12. A method as claimed in claim 1 wherein step (e) further comprises the step of computing a Doppler frequency shift of a bit frequency at an input of said at least one earth-based receiver.

13. A method as claimed in claim 12 wherein said bit frequency, $f_{BF}$, at said input of said earth-based receiver is computed using an equation:

$$f_{BF}=f_{BF}\beta_{CT}\beta_{CR};$$

where $f_{BF}$ is a bit frequency at an output of at least one earth-based transmitter;

$\beta_{CT}=1-V_{CT}/C;$ $\beta_{CR}=1-V_{CR}/C;$ $V_{CT}$ is a closing velocity between said at least one communication satellite and said at least one earth-based transmitter; $V_{CR}$ is a closing velocity between said at least one communication satellite and said at least one earth-based receiver; and C is a speed of light.

* * * * *